J. B. RYLANDER.
SEED SEPARATOR.
APPLICATION FILED APR. 9, 1917.

1,261,299.

Patented Apr. 2, 1918.
2 SHEETS—SHEET 1.

Witness
J. C. Imlery
R. Parker

Inventor
J. B. Rylander
By C. A. Snow & Co.
Attorney

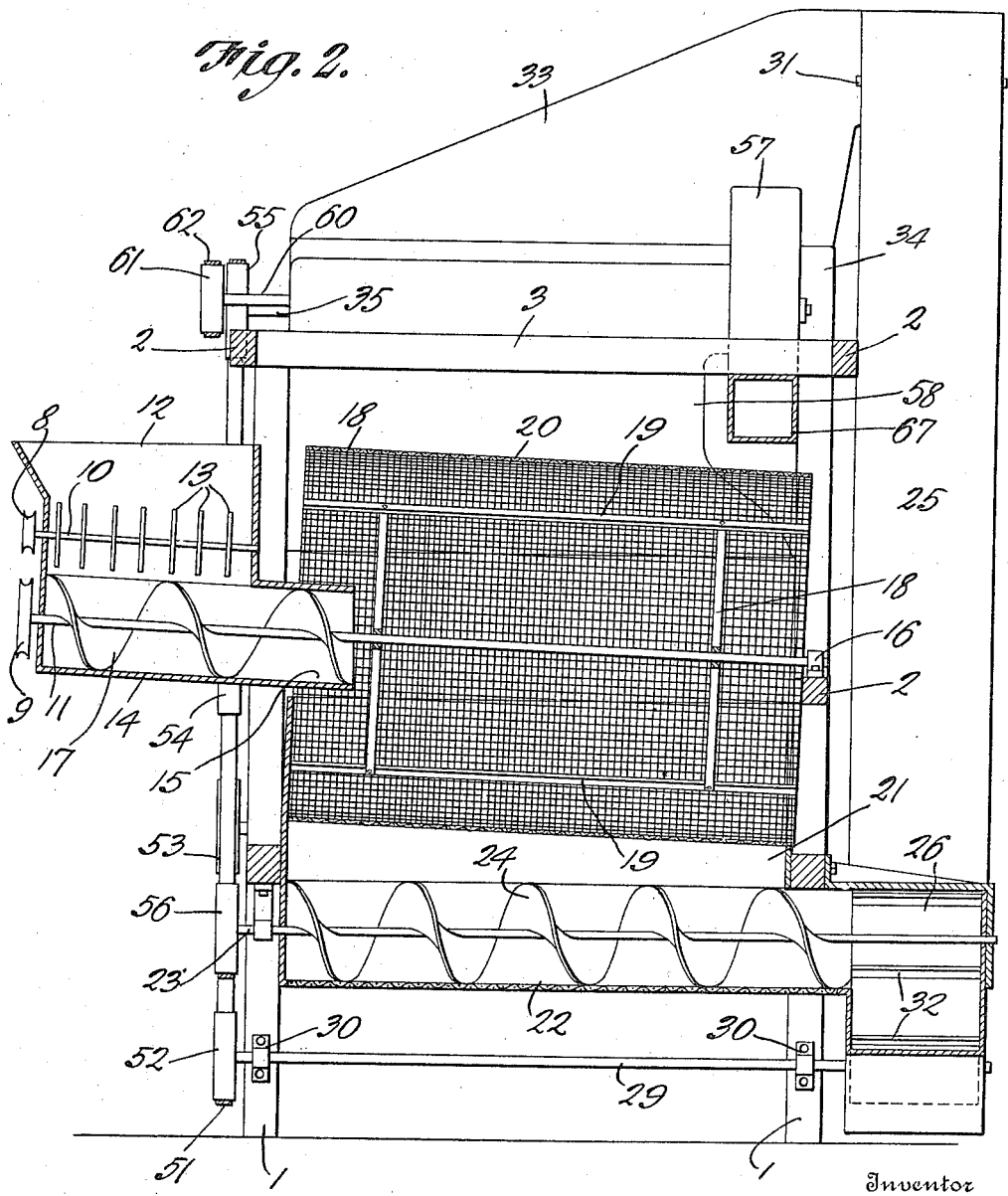

UNITED STATES PATENT OFFICE.

JAMES B. RYLANDER, OF LOCKHART, TEXAS.

SEED-SEPARATOR.

1,261,299.                     Specification of Letters Patent.         Patented Apr. 2, 1918.

Application filed April 9, 1917.   Serial No. 160,791.

*To all whom it may concern:*

Be it known that I, JAMES B. RYLANDER, a citizen of the United States, residing at Lockhart, in the county of Caldwell and State of Texas, have invented a new and useful Seed-Separator, of which the following is a specification.

The subject of this invention is a seed separator in which suction means coöperates with a rotary beater to separate light undeveloped seed from the larger healthier seed.

The objects of the invention are: first, to provide a suction chamber with a rotary beater therein, and means for delivering seed to the chamber and removing healthy seed therefrom; second, to provide means for removing healthy seed from the light unformed seed, and removing the light unformed seed from dust and foreign substances; third, to provide airtight conveyers for delivering seed to and removing seed from the suction chamber; and fourth, to provide a simple, cheap and efficient structure of the character set forth.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings is shown one practical and preferred form of my invention.

In said drawings:—

Fig. 2 is a vertical cross section taken on the line 2—2 of Fig. 1.

Referring to the drawings by numerals:—

Figure 1:
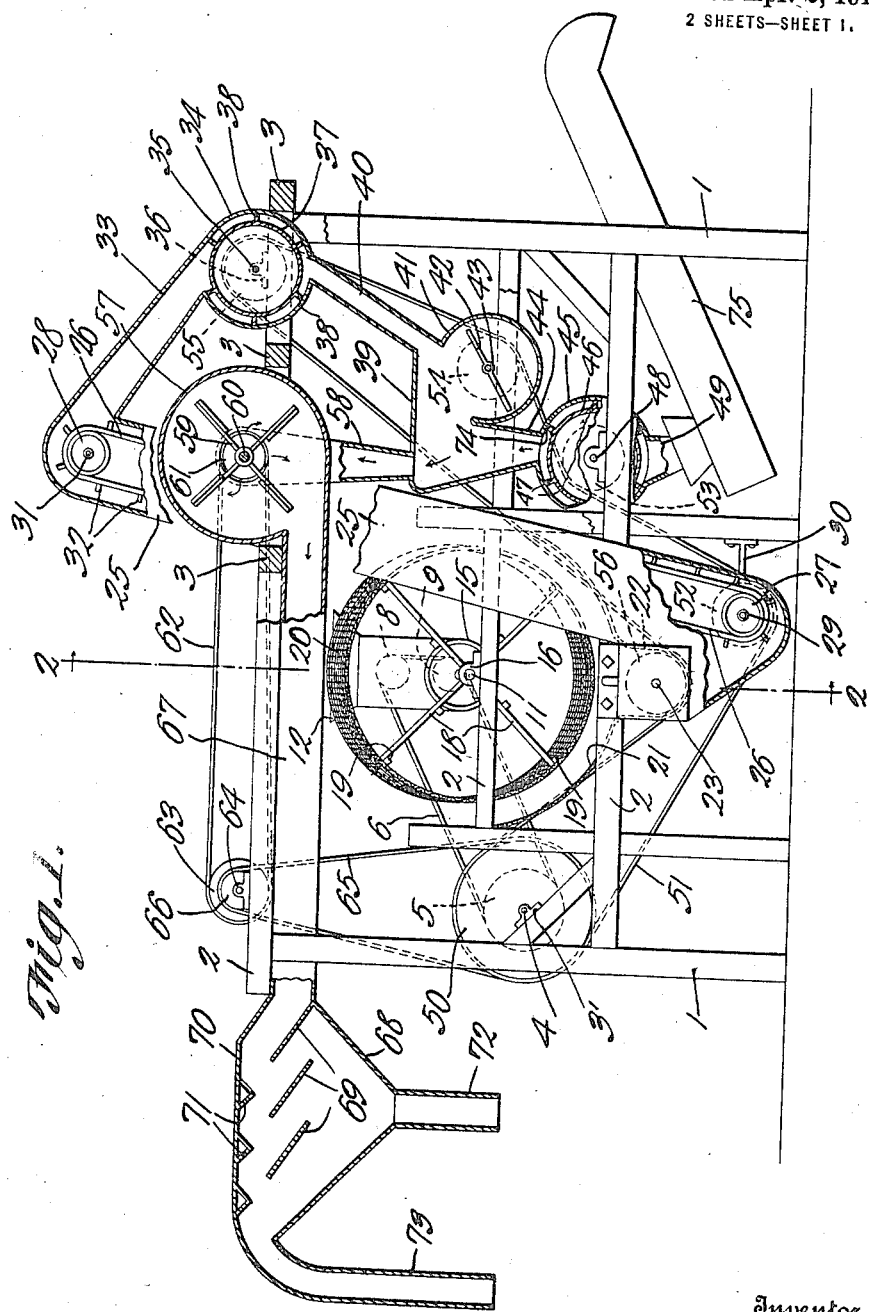
Figure 1 is a side elevation of the machine, a portion of the casing being broken away to show the operative parts.

The uprights 1—1, stringers 2—2, and cross beams 3—3, form the main supporting frame for the machine.

Bearings 3', only one being shown, are provided on the frame, and within said bearings turns a horizontally disposed shaft 4, arranged transversely of the machine. This shaft constitutes the main driving shaft of the machine and is adapted for driving connection with a suitable source of power, not shown. A pulley 5 is provided at one end of the shaft 4, and has connection, through an open belt 6, with a pulley 8 and a pulley 9, mounted on shafts 10 and 11, respectively. The shaft 10 is journaled in the walls of a hopper 12, which extends laterally from the machine, and has secured thereto, within the hopper 12, a series of feeding vanes 13. The hopper 12 is formed with a curved bottom 14, which extends beyond the hopper in one direction, and forms a cylindrical spout 15 for delivering seed from the hopper to the machine.

The shaft 11 is arranged on a slight incline and is journaled, adjacent one end, in a wall of the hopper 12, and at the other end in a bearing 16, secured to one of the stringers 2. Secured to the shaft 11, and positioned within the bottom of the hopper and the spout 15, is a helical feed screw 17, which receives seed from the feed vanes 13 and propels the seed, along the bottom of the hopper and through the spout 15, to the machine. Secured to the shaft 11, within the machine proper, is a drum consisting in arms 18, to the outer ends of which are secured cross pieces 19, arranged parallel with the shaft 11, and the whole forming a support for a cylindrical wall 20, formed of wire mesh. The spout 15 extends within this drum, as is seen most clearly in Fig. 2.

Arranged transversely of the machine, and underlying the cylindrical sieve 20, and spaced therefrom, is a sieve 21, which is bent downwardly to form a substantially semi-cylindrical trough, and which is further bent at its lowest point to form a depending, longitudinal trough 22. Journaled in the frame of the machine, and extending transversely of the machine and through the trough 22, is a horizontal shaft 23, to which is secured a helical flange 24 constituting a screw which are mounted to rotate within the trough 22.

The sieve 20 is arranged to discharge the material which is too large to pass through the mesh into the lower end of an elevator casing 25, as seen most clearly in Fig. 1. Within the casing 25 travels an endless belt 26 which passes over a lower pulley 27 and an upper pulley 28. The lower pulley 27 is mounted on a horizontal shaft 29 which extends transversely of the machine and which is journaled in suitable bearings 30, which are secured to the framework. The upper pulley 28 is provided with a shaft 31 which is journaled in the sides of the casing 25. To the endless belt 26, spaced projecting members 32 are secured, which catch the seed deposited within the casing and elevate it to the top thereof. The elevator casing 25 communicates, at the top thereof, with a downwardly inclined spout 33, at the lower end of which is formed a hollow cylindrical member 34.

Turning within the cylindrical member 34, and secured to a shaft 35, which extends longitudinally through the member 34 and is journaled in bearings 36, secured to the frame of the machine, is a feed valve comprising a cylindrical body 37, and radially extending, flexible vanes 38 spaced around the periphery thereof. Inclined downwardly from the cylindrical member 34, and connecting such member with a suction chamber 39, is an inlet tube 40.

The suction chamber 39 is of irregular shape, as seen most clearly in Fig. 1, and has an offset cylindrical portion 41, arranged adjacent the inlet of the tube 40, in which revolves a beater 42. The beater 42 is secured to a horizontal shaft 43 which is journaled in the framework of the machine and which extends through the cylindrical portion 41, longitudinally thereof. The suction chamber 39 is also provided with a downwardly extending discharge tube 44, the lower end of which is in communication with the cylindrical casing 45 of a discharge valve, which valve consists of a cylindrical body 46 to which radially extending, flexible vanes 47 are secured. The vanes 47 are spaced around the periphery of the cylindrical body. The discharge valve is mounted on a horizontal shaft 48, which is journaled in suitable bearings on the framework of the machine, and which extends longitudinally of the cylindrical casing 45. A discharge spout 49 is provided at the lower portion of the casing 45, through which the seed gravitating from the suction chamber is expelled.

The shaft 23, with its vanes 24; the shaft 35 and the inlet valve carried thereby; the shaft 43 and its beater 42; the shaft 48 and its outlet valve; and the shaft 29 and with it the endless belt 26; are all driven by the pulley 50, which is mounted on the shaft 4, in the following manner:—A belt 51 passes around the pulley 50, from which it leads, under a belt wheel 52, on the shaft 29; over a belt wheel 53, on the shaft 48; over a belt wheel 55, on the shaft 35; and under a belt wheel 56 on the shaft 23.

A cylindrical casing 57 is provided at the upper portion of the machine, which is in communication, through a tube 58, with the suction chamber 39. Turning within the casing 57 is a rotary fan 59 with its shaft 60 and pulley 61, to which motion is imparted by a belt 62, which passes over the pulley 61 and a pulley 63 provided on a horizontal shaft 64 which is journaled in bearings secured to the framework of the machine, and which is driven by a belt 65 which passes over a pulley 66, on the shaft 64 and also over a drive pulley secured to the shaft 4, and which lies immediately back of and is hidden by the pulley 50. (See Fig. 1.)

A horizontally arranged outlet tube 67 extends from the fan casing 57, to the rear of the machine and terminates in a funnel shaped portion, in the upper conical body portion 68 of which are arranged, transversely of the passage of travel of the expelled air, the baffle plates 69. On the cover 70, of the conical body 68, are formed ribs or stops 71, which are arranged above and extend in the same direction as the baffle plates 68. A discharge stem 72 extends downwardly from the apex of the conical body 68, and a discharge tube 73, extends outwardly and downwardly from the upper rim of the body portion.

To create a proper suction and flow of air, an opening 74 may be provided in the casing 45 of the discharge valve.

The seed discharged from the spout 49 may be gathered in any suitable receptacle, and an elevating spout 75 may be provided for the purpose of conveying the seed beyond the framework of the machine.

The operation of the device is as follows:—Seed is fed into the hopper 12, from which it is conveyed by the rotating vanes 13 to the feed screw 17. The screw 17 delivers it through the spout 15 to the interior of the revolving drum-like sieve 20. There dust and other fine matter is removed from the seed and dropped onto the lower sieve 21, which is of finer mesh and which will catch small seeds that may have come through the sieve 20. The screw 24 revolving in the trough 22 of the sieve 21, will stir the material which settles in the trough and thoroughly sift the same. The larger seed, which has remained in the sieve 20, will gravitate to the elevator casing 28 and will be caught by the elevating projections of the endless belt 26 and carried up and discharged into the spout 33. Meantime the seed which has escaped from the sieve 20, will have been sifted and will be gradually propelled by the vanes 24, as the trough 22 fills, to the elevator casing 28 from whence it will be delivered to the spout 33. The grain is received from the spout 33 upon the cylindrical body 37 of the inlet valve, each admitted charge of seed resting between contiguous vanes 38. These vanes are adapted to fit closely against the inner wall of the valve casing and prevent air from leaking through the valve. The seed delivered by the inlet valve, gravitates through the passage 40, into the suction chamber, where it is first delivered on the beater 42, which throws the seed against the walls of the chamber, adjacent the tube connecting the chamber to the fan casing. This scatters the seed and subjects it, while scattered, to a strong suction. By this action, light weight, undeveloped, or diseased seed is drawn to the fan casing, while the heavier, well developed seed gravitates through the discharge spout 44, to the discharge valve, by which it is delivered through spout 49, to any suitable receptacle.

In the meantime, the seed which has been sucked into the fan chamber, is expelled therefrom through the tube 67 and into the conical compartment 68, where it meets the baffle plates 69 and is deflected upwardly against the ribs 71. This action will allow the seed to drop between the baffles and gravitate to the stem 72, through which it discharges, while the lighter dust and other foreign substances, are driven, by the expelled air, through the discharge tube 73.

Having described my invention, what I claim as new and desire to secure by Letters Patent, is:—

1. A seed separator, comprising a supporting frame, a rotary sieve journaled in the frame, a suction chamber, a valve casing communicating with the suction chamber, an air tight inlet valve turning in the casing, another valve casing communicating with the chamber, said casing provided with an air inlet, an air tight discharge valve turning in said casing, a fan casing communicating with the chamber, a fan turning in the fan casing, means for delivering seed to the sieve, means for conveying seed from the sieve to the inlet valve, and means for operating the fan and the valves.

2. A seed separator, comprising a supporting frame, a rotary sieve journaled in the frame, a stationary sieve below the rotary sieve, a suction chamber, a valve casing communicating with the suction chamber, an airtight inlet valve turning in the casing, another valve casing communicating with the chamber, said casing provided with an air inlet, an airtight discharge valve turning in said casing, a fan casing communicating with the chamber, a fan turning in the fan casing, means for delivering seed to the rotary sieve, means for conveying seed from the stationary sieve to the inlet valve, and means for operating the fan and the valves.

3. A seed separator, comprising a supporting frame, a rotary sieve journaled in the frame, a suction chamber provided with an inlet and an outlet, a fan casing communicating with the suction chamber, a fan turning in the casing, a discharge tube leading from the fan casing and merging into an enlarged end, baffle plates arranged within and transversely of the end, a discharge tube depending from the enlarged end immediately below the baffle plates, a discharge tube leading from the upper portion of the enlarged end, means for delivering seed to the sieve, means for conveying seed from the sieve to the suction chamber, and means for operating the fan.

In testimony that I claim the foregoing as my own, I have hereto affixed my signature in the presence of two witnesses.

JAMES B. RYLANDER.

Witnesses:
M. W. SCHULZ,
A. J. STOREY.

Copies of this patent may be obtained for five cents each, by addressing the "Commissioner of Patents, Washington, D. C."